Patented Sept. 19, 1944

2,358,383

UNITED STATES PATENT OFFICE 2,358,383

PRODUCTION OF FILAMENTARY MATERIALS

Albert Charles Chibnall, Totnes, Devon, and Kenneth Bailey, Cambridge, England, assignors to said Chibnall and William Thomas Astbury, Leeds, England No Drawing. Application March 12, 1941, Serial No. 383,048. In Great Britain, Australia, Greece, and India October 22, 1935

29 Claims. (Cl. 18—54)

This invention relates to production of filamentary materials; and it comprises a method of making new and useful filamentary materials, including filaments, fibers, threads, bristles, films and the like, from modified vegetable globulins, and particularly the oil seed globulins, wherein the selected globulin, such as the arachin and conarachin of peanuts, is dispersed in an aqueous solution of urea or other suitable organic nitrogen compound giving a thin liquid, the thin dispersion is purified and aged to increase its viscosity to a point allowing extrusion; is extruded into a medium adapted to counteract the dispersive effect of the organic nitrogen compound and produce a solid, the solidified extrusion product is collected, advantageously under tension, and is hardened by chemical treatment; and it also comprises the new and useful filamentary materials composed of modified vegetable globulins and obtainable in the manner described; all as more fully hereinafter set forth and as claimed.

In another and copending application Serial No. 104,338, filed October 8, 1936, whereof the present application is a continuation-in-part, are described and claimed certain methods of making new and useful filamentary materials from vegetable globulins, and especially from certain oil seed globulins, including the arachins of the peanut (Arachis Hypogaea) and other vegetable globulins obtainable from hemp seed (e. g. edestin) and from the castor oil bean. These filamentary materials, although derived from a purely vegetable source, resemble animal fibers in certain of their physical and chemical properties.

Globulins, as a class, are insoluble in water and strong saline solutions but are soluble in weak saline solutions. Liquids so formed are of no particular utility; but dispersions in solutions of urea and of some other organic nitrogen compounds have the curious property of thickening with age, ultimately gelling. After aging they are viscous enough to permit extrusion as a consistent filament, readily handled. They can be processed to give useful products of good mechanical strength and not attacked by water or the saline solutions in which the original globulins dissolve. The character of the modified globulin product, however, depends to a large extent on that of the original globulin. The best products, we find, are given by oil seed globulins chosen from the class consisting of the globulins of the peanut, the edestin of hemp seed and the globulins of the castor bean.

Artificial filaments have been produced heretofore from certain other proteins, notably casein and silk waste, by wet-spinning viscous solutions of these proteins. However, the filaments produced from the oil seed globulins in accordance with the present invention are of better quality than those produced from animal proteins such as casein and silk waste; and the raw materials for producing these oil seed globulins are more abundant. The filamentary materials of modified vegetable globulin produced in accordance with this invention are better than those previously available, and are also cheaper.

It is an object achieved by the present invention to produce filaments, fibers, threads, etc., having properties more closely resembling those of animal origin (including wool and bristles) than those of cellulosic character; and to produce these filaments, etc., in a simple and economical manner from cheap and abundant vegetable materials. Suitable vegetable materials useful as raw materials in this process are, as stated, peanuts (also called "earth nuts" and "ground nuts"), hemp seeds, castor oil seeds and other oil seeds of like nature; these being generally employed in the form of residues remaining after the extraction or expression of oil from the seeds.

It is another object achieved by the invention to provide a simplified and improved process enabling the production of filamentary materials from protein sources. It is a further object achieved by the invention to facilitate the preparation of a uniform, homogeneously dispersed viscous solution of a protein, adapted for the production of artificial filaments by a wet spinning process. Other objects and advantages achieved by this invention will be apparent from the following description.

Vegetable globulins such as those contained in the mentioned oil seeds are amphoteric proteins having an isoelectric pH range of approximately 4.4 to 5.1. Dilute solutions of a number of salts, acids and alkalis dissolve these globulins, forming thin solutions, but they are precipitated by increasing the saline concentration. For example, they are readily dissolved by dilute aqueous solutions of common salt (sodium chloride), sodium sulfite and sodium bisulfite; but they can be precipitated from such solutions by saturation of the solutions with the salt or by acidification to the isoelectric region.

The vegetable globulins used in the present invention are generally prepared by extraction from such vegetable material as an oil seed press-cake. From this product oil has been removed, at least to a substantial extent. The globulins are extracted with a suitable aqueous solvent medium, e. g. a dilute alkaline or saline solution and the solution separated from the residue. Advantageously after clarification, it is treated with an acid or other precipitant. In the case of saline extracts precipitation of the globulins may be assisted by cooling the extracts. When it is desired to obtain the globulins in dry solid form, the wet precipitates are advantageously washed with a volatile organic dehydrating liquid such as alcohol or acetone, after washing with water.

Vegetable globulins converted into homogeneous dispersions or solutions in most aqueous liquids are characteristically thin and lack viscosity. It has not hitherto been possible to prepare continuous artificial filaments by the application of a wet spinning process to these solutions or dispersions. We have found, however, as stated, that if dry or moist globulins are taken up in urea solutions of suitable concentration, a dispersion or solution is formed which is initially thin enough to permit clarification and other purifying operations, but steadily increases in viscosity upon standing at suitable temperatures, finally becoming a jelly. At a stage of thickening prior to the formation of jelly, the dispersion can be easily extruded to form filaments which can be withdrawn from a suitable coagulating bath, and given after-treatments, advantageously under tension, which make these artificial filaments highly useful in the textile industry and for other purposes.

In more detail, when urea is progressively added to a suspension of a vegetable globulin (such as peanut globulins) in water, with suitable agitation, the mixture first thickens and forms a pasty mass. As the quantity of urea is increased about one part urea for each part of globulin (calculated on a dry basis) the mixture becomes non-viscous and assumes the character of a not very viscous solution in which the vegetable globulin is completely dispersed. The pasty mass initially obtained is useless for spinning, even when diluted with water; and the thin solution as finally obtained by adding more urea is equally useless. It is a remarkable discovery that these thin completely dispersed solutions of vegetable globulins, and especially oil seed globulins, in aqueous solutions of urea, gradually undergo an increase in viscosity during storage. As noted, this increase in viscosity continues until a jelly is produced, but prior to the jelly stage, the thickened dispersions pass through stages in which they have a viscosity enabling them to be drawn out into filaments. In accordance with the present invention, the aged dispersions of vegetable globulins having the desired viscosity characteristics, are extruded through a spinneret into a saline coagulating bath. Coagulated filaments are thus produced and are advantageously drawn out of the bath at a linear rate exceeding the rate of extrusion; that is, they are elongated as they are formed by collecting them under tension.

The invention thus comprises a method of making filamentary materials wherein oil seed globulins extracted and recovered from defatted oil seeds (such as peanuts, hemp seed and castor oil seeds, for example) are dispersed in a concentrated aqueous solution containing sufficient urea to disperse the proteins in homogeneous solution. The resulting solution is ordinarily clarified and deaerated while it is still thin. The possibility of doing this is one of the many advantageous features of the present invention. The thin liquid is then allowed to mature or age until its viscosity has increased sufficiently to enable it to be extruded and drawn in a filamentary form. Before it has set to a jelly, it is extruded through a spinneret into a coagulating bath which is advantageously warm or hot. This bath is a saline solution, preferably acidified; and the coagulated filaments formed by extrusion into the bath are advantageously drawn through it at a linear rate exceeding the rate of extrusion. The filaments are then subjected, advantageously under tension, to treatment with a hardening agent, such as formaldehyde; and sometimes to other treatments, as hereinafter set forth. New and useful filaments are thus obtained.

The time required for the urea solution of the vegetable globulins to become sufficiently viscous may range from several hours to several days, depending on the temperature at which the solution is stored, and on other factors. It is usually advantageous to employ a temperature enough above atmospheric to accelerate aging. When it is desired to store an aged or matured solution without further viscosity increase, that is, when the aged solution is not to be used immediately, further rise in viscosity can be inhibited by cooling; say to about 0° C. The rate at which the urea solution matures and becomes ready for spinning may also be modified by the inclusion of a small amount of one or more substances which may be termed "spinning auxiliaries." These include glyoxal polymer, formaldehyde, ethylene oxide, glycide, salicylic acid, triacetin, sorbitol, glycerol, polyglycols, glucose, triethanolamine and thiourea. Various protective colloids or dispersing agents are also useful; these including glue, gelatin, gum arabic, methyl cellulose, sodium formaldehyde-naphthalene sulfonate, sodium propyl-naphthalene sulfonate and the like.

Aqueous solutions of urea appear to be the most useful solvents for the vegetable globulins. When in proper concentration, they readily dissolve the protein, bring about rapid denaturation or modification, and exert a strong dispersive action on the modified protein. Other solvents which dissolve and denature vegetable globulins in a similar way are aqueous solutions of thiourea, methyl urea and other substituted ureas and thioureas, sodium thiocyanate, formamide, acetamide, urethane, and the lower alkyl esters of amino-formic acid. With all of these, it is often advantageous to add protective colloids and dispersing agents, such as those previously mentioned, and to include one or more spinning auxiliaries.

The amount of urea or other organic nitrogen compound employed in forming the solution of vegetable globulin should be at least equal to the amount of vegetable globulin for best results; and the amount of urea or like solvent and dispersive reagent, when taken with the amount of spinning auxiliary, should be at least equal to the amount of vegetable globulin. The composition of the solution extruded from the spinneret is advantageously about 15 to 30 per cent. vegetable globulin (calculated on a dry basis), about 15 to 35 per cent. urea, about 10 to 0 per cent. of spinning auxiliary, and about 35 to 60 per cent. water. The globulin may conveniently be made into a cream with water, and the urea then added, with agitation, either in dry form or as a strong solution. The optimum time of aging may be readily ascertained by observing, at intervals during the aging of any particular lot of solution, the length and fineness to which a drop taken from the body of solution can be drawn out, either by gravity or between two objects which are readily separated.

In the manufacture of artificial filaments in accordance with this invention, the clarification and deaeration of the protein solution prior to extrusion are operations of great importance. Dirt and mechanical impurities almost inevitably accompany the globulin and remain in the moist or dry preparations. Purification has often been a source of considerable difficulty heretofore. The present invention has the advantage that these treatments can be effected with relative ease, after the globulin has been brought into dispersion with urea. As noted, the complete dispersion of the vegetable globulin in the urea solution does not immediately result in the formation of a highly viscous solution; and as a result, the solution can be subjected to filtration, centrifuging, reduction of pressure, re-subjection to normal pressure, and like operations, before its viscosity has substantially increased.

After the solution has been purified, and aging has been completed, it is generally desirable to filter the liquor again immediately before extrusion. Extrusion is then effected in an ordinary manner through a submerged spinneret, which may be of the single-hole or multiple-hole type. The orifice or orifices in the spinneret may be of any desired size and shape. Round or elliptical, or solid or tubular filaments may thus be obtained. By using a slot orifice, the material may be obtained in the form of thin sheets or films.

The coagulating bath into which the modified vegetable globulin is extruded is ordinarily an aqueous liquid, such as a salt solution, which is advantageously acidified. The effect of the bath is to counteract suddenly the dispersive effect of the solvent (e. g. urea) on the modified globulin. Suitable saline coagulants for use in the bath include sodium sulfate, ammonium sulfate, sodium sulfite, zinc sulfate and the like. Mineral acids and organic acids may be used to acidify the bath, sulfuric acid and acetic acid being suitable. Salts having an acid reaction, such as acid salts, ammonium salts and zinc chloride, may also be used, with or without neutral salts or acids as adjuncts. Acid materials in the coagulating bath facilitate the production of continuous lengths of good quality filament. The solutions employed in the coagulating bath are solvents for urea, and terminate its action quickly. The filaments may, however, be acidified with the acid materials after they have been coagulated in a saline bath. The viscosity of the coagulating bath may be increased, if desired, by the inclusion therein of such materials as gelatin, sorbitol, glycerol, polyglycols, glucose or triacetin. The bath is advantageously maintained at a temperature above 35° C.; a temperature of about 50° C. being generally highly effective.

The filaments coagulated in the bath have a remarkably high extensibility, which is almost completely reversible for extensions up to 100 per cent. and which sometimes amounts to 200 per cent., 300 per cent. or even 600 per cent. With such higher extensions, beyond the elastic limit, the contractile power of the extended filament is correspondingly reduced. Because of the increased strength attained as a result of the stretch during coagulation, it is generally advantageous to collect them, as by winding on a spool, at a linear rate of about 3 to 6 times the rate of extrusion.

The filaments withdrawn from the coagulating bath are generally too hydrophilic to be directly used for textile purposes. They are also too soluble in dilute solutions of sodium chloride and certain other salts, for instance they are soluble in 10 per cent. sodium chloride solution. In order to improve the physical properties of the filaments, and especially to reduce their extensibility, to increase their tensile strength, and to render them less hydrophilic, they are subjected to treatment with what is here termed a hardening agent. Aqueous solutions of formaldehyde are often most convenient for this purpose, but various other substances are useful hardening agents. Among these are aluminium salts, chromium salts, chromates and certain phenolic compounds. Aluminium sulfate, chrome alum, potassium bichromate, tannic acid and picric acid are useful. Picric acid dyes the filaments yellow and chrome alum generally gives them a gray green colour. Sometimes this effect is wanted.

It is often desirable to remove part or all of the retained coagulating solution from the filaments before the hardening treatment is applied, and it is sometimes necessary or desirable to subject the filaments to a dehydrating treatment prior to hardening, in order to prevent the filaments from swelling excessively or dissolving in the hardening bath. Strong solutions of glycerol or sorbitol may be used for this dehydrating treatment; and advantageously be applied while the filaments are still extended; are, for example, on the spools on which they were wound from the coagulating bath. Some of the useful dehydrating materials suitable for this treatment, such as sorbitol and glycerol, have a softening effect on the filaments; but nevertheless a further softening treatment of the hardened (formaldehyde treated) filament is often desirable. Suitable treatments for this purpose include brief immersion in a solution of a wax, such as paraffin wax, carnauba wax or candelilla wax, dissolved in oil or in alcohol.

The hardened filaments of our invention are resistant to cold water and aqueous saline solutions of all concentrations. They have good tensile strength, usually ranging from 7 to 9 kilograms per square millimeter section; and an excellent extensibility amounting to about 40 to 60 per cent. at break. They also have a soft flexible warm handle. They resemble animal fibers such as wool and silk in certain of their chemical and physical properties, but differ in others. Thus they are resilient, but are not characterised by surface scales and do not tend to felt together. Being produced in continuous filaments, they can be cut to any desired length and may be manufactured into textile goods, by ordinary methods, such as carding, drafting, combing, gilling, roving, drawing, twisting, warping, weaving and knitting, either alone or with other textile filaments. Mixtures of the globulin fiber with enough wool to enable felting are desirable for some purposes. The fabrics produced from them may be dry cleaned. The filaments resist the action of a scouring bath containing 0.5 per cent. soap and 0.1 per cent. sodium carbonate at 45° for 20 minutes. They can be therefore successfully laundered under quite ordinary laundry conditions. When the filaments of our invention are subjected to suitable after-treatment to increase their resistance to wet processing, they can be converted into still more valuable textile materials.

Because of the differences in properties, it appears that the molecular structure of the protein in the filaments coagulated from the aged viscous solution of the vegetable globulin in concentrated aqueous urea is different from that of the original globulin used for making up the solution, and from that of powdery precipitates recovered from solutions of the globulin in alkaline, saline or unaged urea solutions. It is believed that in the processes leading to the formation of the filament the originally coiled up molecules of the globulin become uncoiled; that the polypeptide chains are more or less extended and grouped into parallel bundles, a change sometimes referred to as denaturation or degeneration. The beneficial effect of the subsequent hardening, if carried out with formaldehyde, may be due to a reduction in the number of free amino groups. The invention, however, does not depend on any such specific theory. The material of which the coagulated but unhardened filaments, whether acidified or not, are composed, is referred to hereinafter as a modified protein derived from a vegetable globulin. The material of which the hardened filaments are composed is also referred to as a modified protein derived from a vegetable globulin, although as noted it has different properties.

In obtaining vegetable globulins from peanuts, castor beans and other oil seeds for use in accordance with this invention, it is always best to avoid the use of temperatures above about 40° C. since it is undesirable to alter or cook the protein and thus change its properties before it has been extracted and isolated. Oil seeds may be crushed to form a meal and then defatted by extraction with easily volatile oil solvents, such as light petroleum hydrocarbons, low boiling chlorinated aliphatic hydrocarbons, trichlorethylene and the like. It is advantageous to remove as much of the oil in the defatting process as can conveniently be arranged, and whether an expression process or extraction process is used, it should be conducted without excessive heating of the material. Globulins are extracted from the defatted residue, as by means of a cold dilute alkaline solution, and the solution may be filtered or centrifuged or both, in order to clarify it. Sodium or potassium carbonate, sodium or potassium hydroxide, ammonia, sodium or potassium sulfide, sodium sulfite, lime water or the like may be used. The concentration employed should not be sufficient to cause extensive hydrolysis of the globulins; and in the case of the caustic alkalies we have found concentrations of about 1/20th normal to be suitable, the volume of the solution amounting to about 10–20 times the weight of the meal, or more. From the alkaline solution the globulin can be recovered in good yield by carefully acidifying it to the isoelectric region of the globulin; for instance, with sulfuric or sulfurous acid.

After the globulin has been filtered off and washed it may be dried in the air with or without the assistance of neutral volatile organic solvents soluble in water, such as alcohol or acetone.

When so obtained, the globulin usually contains about 10 to 12 per cent. moisture as determined by drying a sample to constant weight at 100° C. The presence of a little residual oil in the globulin may render the urea solution slightly turbid, but this does not matter; it does not prevent successful spinning.

The vegetable globulins may be extracted by means of saline solutions instead of alkalies, for instance, with a 2 to 5 per cent. sodium chloride solution. It is sometimes possible to obtain clearer solutions in this manner, especially with a meal which has not been very thoroughly defatted. The introduction into the extract of soap derived from free fatty acids in the oil is also avoided. The globulin may be recovered from the saline solution by acidification to the isoelectric region or by diluting the solution and cooling it to a temperature slightly above the freezing point of the extract. While as stated the globulin is not soluble in water, it often happens that salts are present in the meal to an extent rendering it possible to employ water as an extracting agent.

The invention is illustrated but not limited by the following examples, in which the parts are parts by weight.

*Example I*

35 parts of peanut globulin (containing about 12 per cent. of moisture), 25 parts of crystalline urea, 5 parts of crystalline thiourea and 1 part of sorbitol are ground up to a fine powder in a mortar. 1 part of sheet gelatin, and 0.5 part of glyoxal polymer are dissolved in 78 parts of water. This solution is added slowly with stirring to the powdered mixture, when complete or nearly complete dispersion is readily obtained. The viscous solution thus obtained is filtered and the filtrate centrifuged at high speed to remove air bubbles. The clarified liquor thus obtained is allowed to stand for about 20 hours. During this period the viscosity rapidly rises, and the solution is then ready for spinning. But it is in the best condition for spinning between the second and fifth day following the initial preparation. After this period it may gel.

For spinning the filaments or fibers the ripened solution is passed through a spinneret immersed in a bath containing the following substances:

| | Parts |
|---|---|
| Ammonium sulfate | 15 |
| Zinc chloride | 2 |
| Conc. sulfuric acid (98 per cent) | 4.5 |
| Glycerine | 10 |
| Water | 75 |

The bath is kept at a temperature of about 50° C. and the filaments produced are spun on to a spool placed in such a position that the filaments are drawn through the solution for a distance of about 15 inches. The filaments or fibers from a single, or better, a multiple jet spinneret are produced at a rate of about 130–150 meters a minute. The spool itself rotates above a second bath containing either (1) a solution made by mixing equal volumes of water and glycerol, or (2) an aqueous solution containing 25 per cent. by weight of sorbitol, and is so placed that the fibers or filaments collecting on the spool are continuously bathed in the fluid, which is kept at room temperature.

When a sufficient quantity of filament has been collected it is removed from the spool and immersed for at least 2 hours in a third bath containing a solution of the same composition as the second, which is also at room temperature. This third bath acts as a softener.

The mass of filament or fiber is then immersed in a fourth bath containing commercial 40 per cent formaldehyde at room temperature for about 18 hours. The filaments or fibers are thereby strengthened. They are then thoroughly washed with water and dried. The quality and appearance of the filaments are further improved by immersion in a softening bath containing an aqueous 1 per cent. solution of urea for 1 hour at room temperature, followed by washing and drying. Enhanced luster is obtained by immersion for 15 minutes in a warm solution of paraffin wax (5 per cent. in olive oil).

*Example II*

2 parts of 40 per cent. formaldehyde, 2 parts of glycerol, 25 parts of air-dry castor seed globulin (containing about 12 per cent. moisture) are placed in a mortar and ground to a cream with 78 parts of water. 30 parts of crystalline urea are then added slowly with stirring. Dispersion of the protein is readily effected, and the solution is first filtered and then centrifuged to remove air bubbles. The viscosity of the resulting solution increases rapidly during the next 4 hours. It is then ripe for spinning and will remain so for 3-4 days. Spin as in Example I with bath of following composition kept at 40°.

| | Parts |
|---|---|
| Sodium sulfite | 10 |
| Glacial acetic acid | 5 |
| 40 per cent. formaldehyde | 2.5 |
| Water | 80 |

The filaments or fibers are collected on a spool at the rate of 70-80 meters per minute. The spool is run in the air or partially immersed in the bath as in Example I. After-treatments are applied as in Example I.

*Example III*

A peanut cake from which the oil has been removed is extracted with sodium hydroxide of 0.2 per cent. concentration, and the globulins are precipitated by treatment of the centrifuged alkaline extract with sulfur dioxide. 24-25 parts by weight of the air-dry protein (10 per cent. moisture) are thoroughly wetted with 70 parts by weight of water and formed by mechanical action into a smooth paste, to which is added 30 parts by weight of crystalline urea. Mechanical action is continued until the protein is dissolved. The solution is filtered and deaerated while still freshly made. It is then aged for 48 hours at 23° C. after which the viscosity is sufficient to enable it to be used for the preparation of filaments. The solution is extruded through a spinneret into a bath kept at 50° C. containing 100 parts by weight of water, 12.25 parts by weight of commercial salt-cake, and 4.04 parts 98 per cent. sulfuric acid. The material is wound up under tension at a speed of about 70 meters per minute, which is five times the linear rate of extrusion. The fiber is wound into the form of a hank and washed in 50 per cent. glycerine while stretched to maintain its length. While still stretched, it is further treated for 24 hours at room temperature with 40 per cent. formaldehyde solution. The hank is now washed thoroughly in several changes of cold water, wrung out and dried off. The filaments of this example are not only resistant to the action of dilute common salt solutions, for instance, of 2 to 5 per cent. concentration, and of cold water, but they may also be treated without damage by agitation in a bath containing 0.5 per cent. soap and 0.1 per cent. sodium carbonate at 45° C. for 20 minutes. After this treatment they may be rinsed in water and dried at a temperature of about 40 to 50° C. and will still retain a desirable handle.

In many preparations of filaments according to our invention, by methods of which the above examples are illustrations, we have found the tensile strengths of the air-dry filaments to range between 7 and 9 kilograms per square millimeter section, and the extensibilities to range between 40 and 60 per cent. at break, the filaments having a soft, flexible warm handle and being insoluble in water and common salt solutions of any concentration, and also being resistant to the action of warm dilute alkaline soap solution and warm water. Such filaments can be dried at about 40-50° C. but should not be boiled with water.

As many apparently widely different embodiments of the invention can be made without departing from the spirit and scope thereof, it must be understood that the invention is not limited to any specific embodiment except as defined in the appended claims.

What we claim is:

1. In making textile threads from globulins, the process which comprises forming a dispersion of modified vegetable globulin in a solution of urea, extruding the dispersion into a liquid capable of counteracting the dispersive effect of urea, and thereby forming filaments therefrom.

2. The process of claim 1, to which is added the step of treating the filaments with formaldehyde to improve their strength.

3. The process of claim 1, including the step of ripening said dispersion of modified globulin in urea solution by allowing it to stand for several hours before the step of extruding the dispersion to form filaments.

4. The process of claim 1, wherein the modified globulin is peanut globulin.

5. A process for producing artificial filaments, threads and films from vegetable globulins which comprises forming a solution of a modified vegetable globulin, in a form insoluble in pure water, in an aqueous solution of an organic nitrogen compound selected from the class consisting of ureas and thioureas and their substitution products, formamide, acetamide, sodium thyocyanate, and lower alkyl esters of aminoformic acids, under such conditions that the globulin is dispersed in said solution and is denatured thereby, extruding the solution of dispersed denatured globulin through an orifice to impart the desired shape to the product, into an aqueous salt solution capable of coagulating the extruded protein into a product having useful properties and collecting the coagulated product.

6. The process of claim 5, wherein the modified globulin is peanut globulin.

7. The process of claim 5, including the step of ripening the globulin solution by allowing it to stand for several hours before said extrusion.

8. The process of claim 5, wherein the aqueous salt solution for coagulating the globulin dispersion contains a small amount of free acid.

9. The process of claim 5, wherein the coagulated extruded product is collected under tension.

10. The process of claim 5, to which is added the step of immersing the coagulated product in an aqueous solution of a reagent which increases its mechanical strength.

11. The process of claim 5, to which is added the step of subjecting the coagulated product to an after-treatment with an aqueous solution of formaldehyde to increase its mechanical strength.

12. The process of claim 5, to which is added the steps of subjecting the coagulated product to successive after-treatments with an aqueous solution of a reagent adapted to increase its mechanical strength, and with a softening agent.

13. Process for the production of artificial filaments and threads which comprises dissolving peanut globulin in water containing urea, thiourea, gelatin, sorbitol and glyoxal polymer so that the solution contains approximately 20 per cent. by weight of the globulin, approximately 20 per cent. by weight of the two ureas, and approximately 58 per cent. by weight of water and squirting the solution through an orifice into a coagulating liquid comprising an aqueous solution of ammonium sulfate, zinc chloride, sulfuric acid and glycerol containing about 70 per cent. by weight of water, the filaments being collected under slight tension on a suitable carrier.

14. Process according to claim 13 in which the filament is subjected to successive after-treatments (a) in aqueous sorbitol, (b) in aqueous formaldehyde, (c) in a warm solution of paraffin wax in olive oil.

15. A process for preparing filamentary material which comprises forming a solution in which a vegetable globulin is completely dispersed in an aqueous medium containing urea, clarifying and deaerating the solution, aging the solution until it has become sufficiently viscous to be drawn out into filaments, and then extruding it into a saline coagulating solution and withdrawing the filaments at a linear rate exceeding the rate of extrusion.

16. The process of claim 15, wherein the coagulating solution is acidified.

17. The process of claim 15, wherein the withdrawn filaments are subsequently washed under tension with a material of such character as to dehydrate the filaments without injuring them.

18. The process of claim 15, wherein the withdrawn filaments are treated with a hardening agent while under tension.

19. A process for preparing filaments which comprises treating a suspension of a vegetable globulin in water with sufficient urea to completely disperse the globulin into solution, aging the solution until its viscosity is increased sufficiently to enable it to be drawn out into filaments and wet spinning it into a coagulating solution.

20. A process for preparing filaments which comprises treating a suspension of a vegetable globulin in water with sufficient urea to completely disperse the globulin into solution, aging the solution until its viscosity is increased sufficiently to enable it to be drawn out into filaments and wet spinning it into an acidified saline coagulating solution maintained at a temperature substantially above room temperature.

21. The process of claim 19, in which the said suspended and dispersed vegetable globulin is an oil seed globulin which has not been exposed to a temperature of above 40° C. in the course of its preparation.

22. A process for preparing filaments which comprises treating a suspension of a vegetable globulin in water with sufficient urea to completely disperse the globulin into solution, aging the solution until its viscosity is increased sufficiently to enable it to be drawn out into filaments, wet spinning it into a coagulating solution and acidifying the resulting filaments.

23. The process of claim 19, in which the said vegetable globulin is derived from peanuts.

24. In a process for preparing filaments from vegetable globulin, the combination of steps which comprises forming a solution containing about 15 to 30 per cent. of the globulin, calculated on a dry basis, about 15 to 35 per cent. of urea, about 10 to 0 per cent. of a spinning auxiliary therein comprising thiourea, and about 35 to 60 per cent water, agitating the mixture until the globulin is completely dispersed, and aging the solution until it can be drawn out into filaments.

25. The process of claim 19, wherein the said solution comprising a vegetable globulin and urea is treated to effect clarification and deaeration before its viscosity has increased sufficiently to render it capable of being drawn into filaments.

26. In a process for preparing filaments from vegetable globulin by a wet spinning process wherein extruded and coagulated filaments are withdrawn from a coagulating bath at a rate exceeding the rate at which they are extruded, the operation comprising washing the coagulated filament in an aqueous solution of glycerol of a concentration operative to dehydrate the filament, and subsequently hardening the filament with formaldehyde while the filament is stretched to maintain its length.

27. In a process for preparing filaments from vegetable globulin, the combination of steps which comprises forming a solution containing about 15 to 30 per cent of the globulin, calculated on a dry basis, about 15 to 35 per cent of urea, and the balance essentially water, agitating the mixture until the globulin is completely dispersed, and aging the solution until it can be drawn out into filaments.

28. A modified protein in filamentary form comprising a modified vegetable globulin coagulated from a dispersion of said globulin in an aqueous solution of an organic nitrogen compound selected from the class consisting of ureas and thioureas and their substitution products, formamids, acetamide, sodium thiocyanate and the lower alkyl esters of amino formic acids, said filamentary material being resistant to the action of a scouring bath containing 0.5% soap and 0.1 percent sodium carbonate at 45° C. for twenty minutes, and insoluble in sodium chloride solutions and water.

29. A modified protein in filamentary form comprising a vegetable globulin coagulated from a dispersion of said globulin in a solution of urea, and characterized by resistance to the action of a scouring bath containing 0.5 per cent soap and 0.1 per cent sodium carbonate at 45° C. for twenty minutes, said filamentary material being insoluble in sodium chloride solutions and water.

ALBERT CHARLES CHIBNALL.
KENNETH BAILEY.